B. F. FELIX.
Ear for Well-Bucket.

No. 202,938.  Patented April 30, 1878.

Witnesses

Inventor
Benjamin F. Felix
By Gridley & Sherburne
Attys

UNITED STATES PATENT OFFICE.

BENJAMIN F. FELIX, OF CHICAGO, ILLINOIS.

IMPROVEMENT IN EARS FOR WELL-BUCKETS.

Specification forming part of Letters Patent No. 202,938, dated April 30, 1878; application filed March 23, 1878.

*To all whom it may concern:*

Be it known that I, BENJAMIN F. FELIX, of Chicago, in the county of Cook and State of Illinois, have invented certain new and Improved Ears for Well-Buckets; and I do hereby declare the following to be a full, clear, and exact description thereof, which will enable others skilled in the art to which my invention appertains to make and use the same, reference being had to the accompanying drawing, forming part of this specification, in which—

Figure 1:
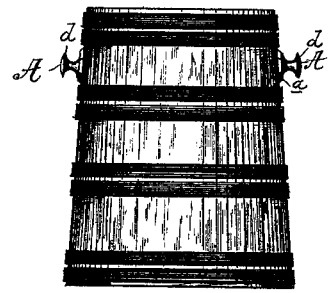
Figure 2:
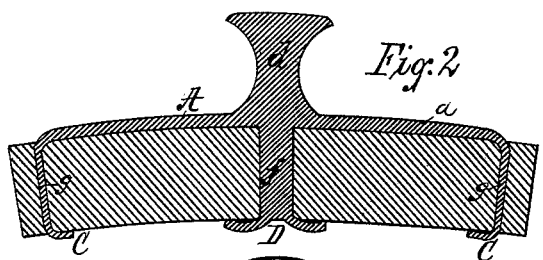
Figure 3:
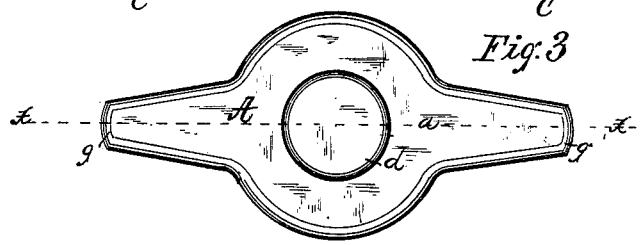

Figure 1 represents an elevation of a well-bucket embodying my improvement. Fig. 2 represents an enlarged sectional plan of one of the staves, cutting the ear through at line $x\ x$, Fig. 3. Fig. 3 represents a front view of one of the ears detached from the stave.

The object of my invention is to improve the construction of the ears of well-buckets, so as to render them stronger, more durable, and easily attached to the bucket, and less liable to be broken off; and to that end my invention consists in the construction and arrangement of the same, as hereinafter described and claimed.

In the drawing, A represents the ear proper, which consists of a plate, $a$, formed of brass, malleable or wrought iron, enlarged at its center laterally, and provided on its face and at the center with a link or knob, $d$, adapted to receive the bail of the bucket, and on its back and at the center with a shank, $f$, adapted to pass through the stave of the bucket.

The ends of the plate are bent at a right angle to the plane of the back, so as to form shanks $g\ g$, which also pass through the stave, and are of the proper length to admit of being bent or clinched against the inner surface of the stave, as shown at C C.

The shank $f$ is forked or slit at its inner end, and projects through the stave, so as to allow the two parts to be bent in opposite directions and against the inner surface of the stave, as shown at D, thus firmly connecting the ear to the stave. By this arrangement of the shanks the ears proper are so connected to the stave as to prevent the same from being severed from the bucket or loosened by continual use, as is the case with washers and screw-nuts arranged upon the center shanks of the ears.

Having thus described my invention, what I claim as new, and desire to secure by Letters Patent, is—

The well-bucket ear A, consisting of the plate $a$, provided with the knob $d$ and the forked shank $f$, and shanks $g\ g$, adapted to pass through the stave and admit of being bent or clinched against the inner surface thereof, substantially as specified.

BENJAMIN F. FELIX.

Witnesses:
G. R. HOFFMAN,
N. C. GRIDLEY.